United States Patent [19]

Sudan

[11] Patent Number: 5,339,336
[45] Date of Patent: Aug. 16, 1994

[54] HIGH CURRENT ION RING ACCELERATOR

[75] Inventor: Ravindra N. Sudan, Ithaca, N.Y.

[73] Assignee: Cornell Research Foundation, Inc., Ithaca, N.Y.

[21] Appl. No.: 19,115

[22] Filed: Feb. 17, 1993

[51] Int. Cl.$^5$ ............................................... G21B 1/00
[52] U.S. Cl. ..................................... 376/107; 376/127
[58] Field of Search ............... 376/107, 127, 130, 128, 376/129, 139, 144, 145; 250/251

[56] References Cited

U.S. PATENT DOCUMENTS

| | | | |
|---|---|---|---|
| 3,402,358 | 9/1968 | Wharton | 250/251 |
| 3,626,305 | 12/1971 | Furth et al. | 376/139 |
| 3,887,832 | 6/1975 | Drummond et al. | 315/4 |
| 4,070,595 | 1/1978 | Miller | 313/359.1 |
| 4,246,067 | 1/1981 | Linlor | 376/107 |
| 4,267,488 | 5/1981 | Wells | 376/107 |
| 4,290,848 | 9/1981 | Sudan | 376/106 |
| 4,293,794 | 10/1981 | Kapetanakos | 376/106 |
| 4,672,615 | 6/1987 | Kelly et al. | 376/106 |

OTHER PUBLICATIONS

P. D. Pedrow et al., Phys. Fluids B 1, 1059 (1989).
R. N. Sudan et al., Phys. Rev. Lett. 33, 355 (1974).
P. L. Dreike et al., Phys. Rev. Lett. 46, 539 (1981); Phys. Fluids 25, 59 (1982).
J. M. Finn et al., Nucl. Fusion 22, 1443 (1982).
H. H. Fleischmann et al., Nucl. Fusion 15, 1143 (1975).

*Primary Examiner*—Daniel D. Wasil
*Attorney, Agent, or Firm*—Jones, Tullar & Cooper

[57] ABSTRACT

An ion ring accelerator employs a pulsed magnetic field to accelerate a charge neutralized ion ring. The accelerator includes a plurality of accelerator modules arranged either in a linear or a recirculating manner, each of which cause an incremental acceleration of the ion ring. As the ion ring enters one of the accelerator modules, a pulse is applied to a coil or resonant cavity in the module which increases in magnitude and synchronism with the passage of the ion ring. As a result, the ion ring is exposed to an increasing magnetic field in the module which compresses the ring, thereby adiabatically increasing its energy. As the ion ring exits the module and is no longer exposed to the increase in magnetic field, it expands, thereby releasing energy and accelerating in an axial direction. The repetition rate of the high current ion ring accelerator will be determined by the power supplies for the modules.

12 Claims, 6 Drawing Sheets

HIGH CURRENT ION RING ACCELERATOR

BACKGROUND OF THE INVENTION

The present invention relates in general to an ion accelerator in which a charge neutralized ring of ions can be accelerated to energies up to 1 GeV and beyond through use of an inductive accelerating electric field.

There are many applications for high current, high energy ion accelerators, such as drivers for inertial confinement nuclear fusion, intense neutron sources for transmutation of radioactive wastes and other research and industrial uses. In a high current accelerator, by definition, the number of ions in a particle bunch to be accelerated must be large. Above a critical number density, space charge neutralization by electrons is essential. Charged neutralized bunches of ions, however, cannot be accelerated by a longitudinal electric field. For electrostatic acceleration, a transverse magnetic field which insulates the electrons has been employed successfully in intense ion diodes. This technique, however, is applicable only to single stage acceleration or at most two stage acceleration, thus limiting the ion energy to the range of 10-20 MeV, For multistage acceleration to higher energies of 100 MeV to 1 GeV, the accelerating electric field must be inductive. A need therefore exists for an accelerator structure and method by which particles can be accelerated using an inductive accelerating field.

SUMMARY OF THE INVENTION

The present invention fulfills this need by providing a high energy ion accelerator in which the particle bunch of a conventional accelerator is replaced by a charged neutralized ring of ions circulating in an external magnetic field. An inductive accelerating field is employed in the azimuthal direction which increases the ring energy by acting on the net ring current. The energy acquired from the inductive field in the azimuthal motion is converted to axial motion in the accelerating module. This process is repeated many times in a sequence of accelerating modules so that the ion ring, whose dimensions do not change on average, is accelerated to the required final energy which is almost entirely in the axial motion of the ring.

For accelerating ions from 0.1 to 1 GeV and higher, one or more serially arranged acceleration modules are necessary. Since the ion ring is charge neutral, each acceleration module employs an inductive azimuthal electric field because the net ion ring current is only in the azimuthal direction. In its simplest form, each acceleration module consists of a single turn coil energized by a pulse power source and arranged so that the ion ring travels through it in an axial direction. Alternatively, a resonant cavity powered by an Rf power supply is employed in each module. A pulsed magnetic field is produced by the current in the coil or cavity which causes an increase in the energy of the ions in the ring, and this energy is entirely in the azimuthal motion of the ions. The ring is thereby caused to be compressed. The pulses energizing the coils of the acceleration modules are switched to synchronize with the arrival of the ion ring at the entrance of the individual coils or cavities so that the ring enters when the pulsed magnetic field is at its minimum and exits when it is at its next maximum. Thus the total magnetic field just inside the accelerator coil or cavity is larger than the field outside the coil or cavity at the instant the ring is exiting the module. This causes the ring to expand and accelerate axially by converting the energy acquired in the coil or cavity through compression to axial kinetic energy. The major radius of the ring after the axial acceleration is the same as on entry into the accelerator module. With this arrangement, the energy level of the ion ring can be repeatedly increased without the requirement of an increase in magnitude of the applied magnetic fields.

BRIEF DESCRIPTION OF THE DRAWINGS

The objects, features and advantages of the present invention will become apparent from the following detailed description of preferred embodiments thereof, taken in conjunction with the accompanying drawings in which.

DETAILED DESCRIPTION OF THE PREFERRED EMBODIMENTS

Turning now to a more detailed consideration of a number of preferred embodiments of the present invention, a discussion of the principles on which the present invention works will first be presented. The ion ring accelerator of the present invention requires the use of an ion ring in equilibrium which is completely charge neutralized and may be partially current neutralized by electrons. It consists of a number of ions with energy E and charge Ze gyrating in an external magnetic field B. The ring major and minor radii are R and a respectively; R is larger than the single particle gyro-radius due to the demagnetizing effect of the self magnetic field created by the net ring circulating current I. The ion space charge is completely neutralized by $N_e = NZ$, electrons.

The net ring current $I = I_i - I_e$ is the difference between the azimuthal ion and electron currents. It is possible that under certain circumstances $I_e = 0$. The self-magnetic field $\delta B$ produced by I prevents the rings ions from spreading in the axial (along B) direction while the external field B does the same service for radial motion. Now, $\zeta = \delta B/B$ is determined by N/R and in practice a minimum value ranging from 10–50% must be maintained for the ring to maintain its integrity.

Figure 1:
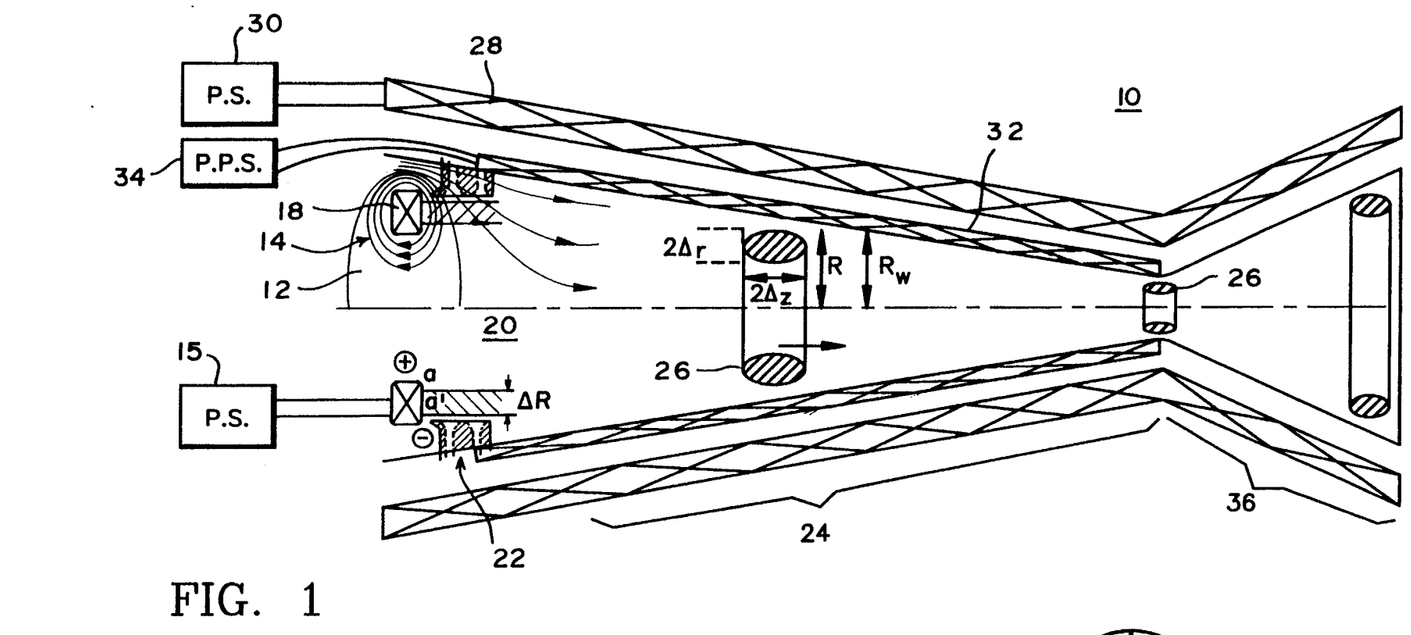
FIG. 1 is a schematic illustration of an ion ring injector for use in forming and accelerating an ion ring for use in the present invention.
Figure 2:
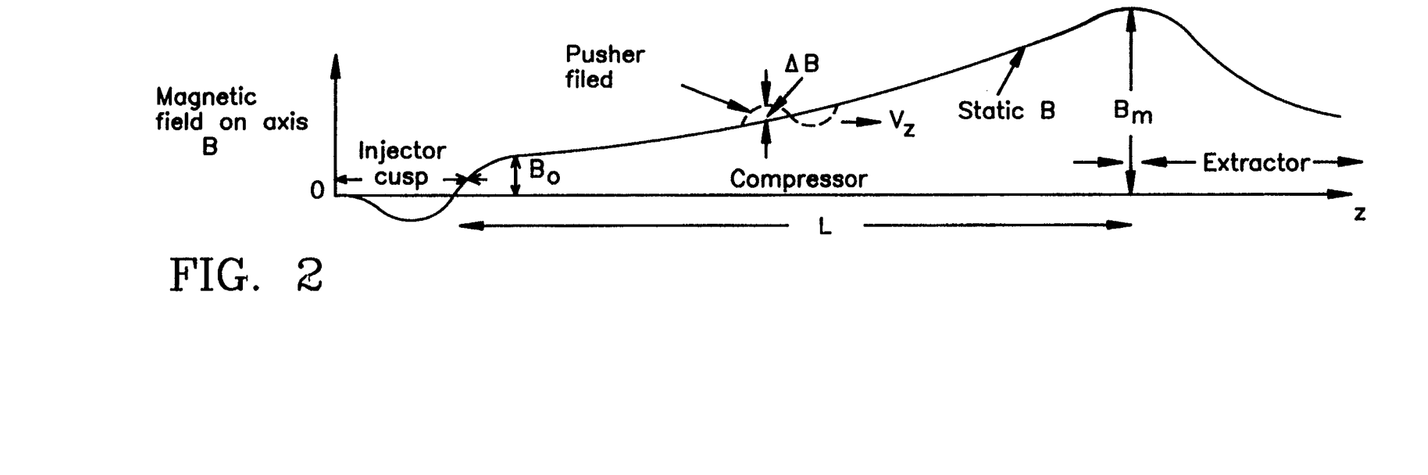
FIG. 2 is a graph illustrating the magnitude of the magnetic field along the longitudinal axis of the structure of FIG. 1.

FIG. 1 illustrates an ion ring injector structure 10 which includes a magnetically insulated pulsed powered diode 12 for formation of an ion ring. Such a diode is disclosed in Applicant's previously issued patent, U.S. Pat. No. 4,290,848 entitled "Ion-Ring Ignitor for Inertial Fusion", which is hereby incorporated by reference. The diode 12 includes a ring shaped anode 14 that forms an ion emission annulus capable of emitting ions by any one of a number of known techniques, such as a flash board or a gas source. The anode 14 is powered by a diode power supply 15 and contains a coil 18 for producing a cusp shaped magnetic field in the vicinity of the diode 12 (as illustrated in FIG. 2) that forms a magnetic cusp injector region 20. The magnetic cusp formed by the coil 18 must be as sharp as possible so that ions above a predetermined cut-off energy will pass through the cusp injector region to form a ring, while ions below the cut-off energy will be repelled by the magnetic field. Ions accelerated across the diode gap with velocity $v_z$ pick up an azimuthal velocity $v_\theta$ because of the Lorentz force exerted by the radial component of the magnetic field. To minimize radial defocusing and axial $v_z$ velocity spread, the anode ion emitting surface must coincide with a surface on which the magnetic flux $\psi$ is constant. This requirement follows from the fact that because of azimuthal symmetry, the canonical angular momentum of the emitted ions $P_\theta$ is conserved.

For the prompt neutralization of the ion space charge, a plurality of fast gas-puff valves 22 are disposed adjacent the injector region 20 which are employed to direct a supersonic jet of neutral gas therein. This is employed to rapidly scatter electrons emitted from nearby surfaces so that they can be captured and employed to charge neutralize the ion ring. Current neutralization is avoided in the ion ring by choosing a neutral gas having a low atomic number, such as hydrogen, and providing a conducting surface close to the injected ion ring to line tie the magnetic field lines, i.e., to insure that the electric field transverse to the field lines is reduced to a minimum. Beyond the cusp, the ion ring is well formed and propagates in a tenuous low density plasma, and eventually in high vacuum.

Ion ring acceleration is accomplished in two stages. In first, compressor stage 24, a formed ion ring 26 is compressed magnetically by pushing it to regions of higher static magnetic field. The static magnetic field is produced by one or more solenoid coils 28 that are excited by a DC power supply 30. The solenoid coils 28 are positioned along the length of the compressor stage 24 in a decreasing radius fashion, and may be cryogenic or superconducting if energy consumption becomes too great. A set of pusher coils 32 are also disposed in the compressor stage 24 which are energized by a pulsed power 34 in a sequential manner so that a travelling pulse of magnetic field is produced that pushes the ion ring 26 toward a region higher static magnetic field, thereby reducing the ring dimension and increasing ring energy adiabatically. From the conservation of ring canonical angular momentum and the magnetic flux, the following relationship is obtained:

$$R/R_o = (B_o/B)^{\frac{1}{2}}$$

$$E_i E_{io} = B/B_o$$

where $R_o$, $E_{io}$ and $B_o$ are the initial ring major radius, ion energy and external magnetic field, respectively, and R and $E_i$ and B are the final values.

The ion ring 26 is extracted from the final stage of compression by expanding the external magnetic field in an extractor stage 36. The ion ring 26 acquires a mean axial velocity $\bar{v}_z$ which can be computed from the conservation of total ring energy W, the canonical angular momentum $\bar{P}_o$ and the ring magnetic flux $\psi$, which yields:

$$\bar{v}_z = (2/m)^{\frac{1}{2}}[W/N - \lambda_1(B/B_f) - \lambda_2(B/B_f)^{\frac{1}{2}}]^{\frac{1}{2}}$$

where $B_f$ and B are the magnetic fields before after expansion, and $\lambda_1$ and $\lambda_2$ are constants dependent on ring parameters before expansion and m is the ion mass.

Figure 3A:
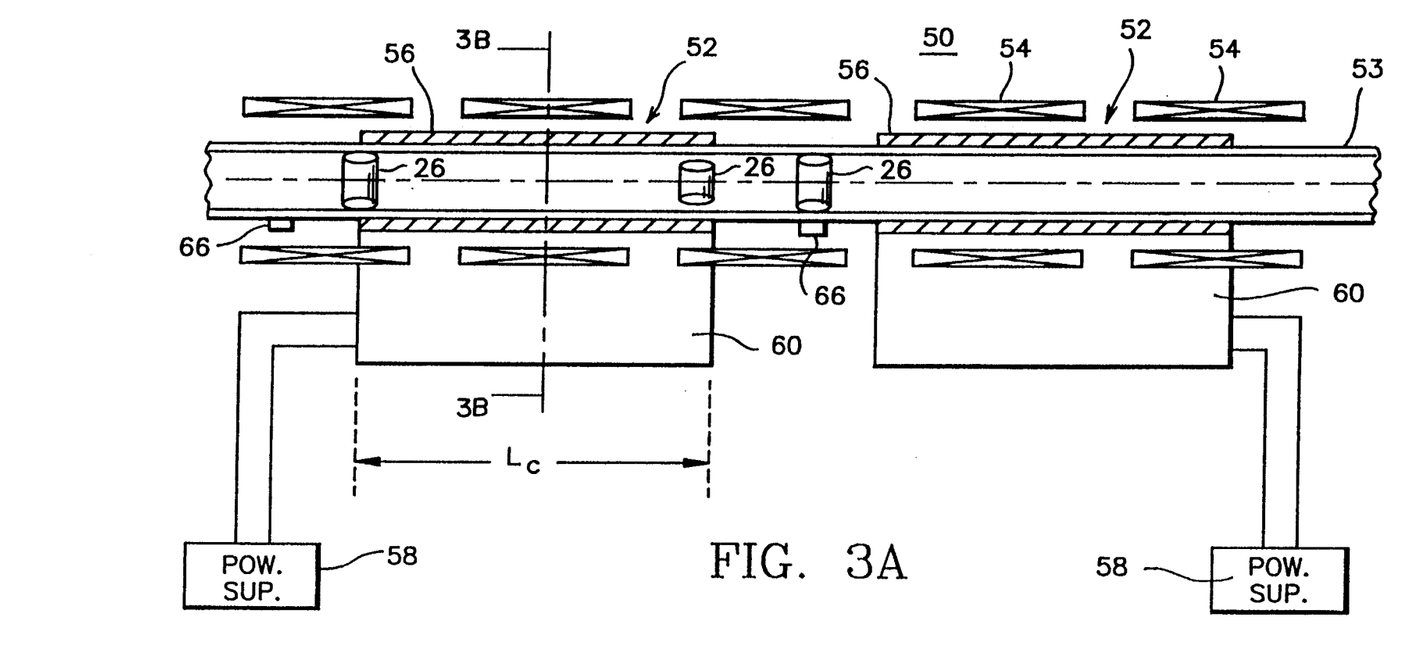
FIGS. 3A and 3B are partial front and end schematic illustrations, respectively, of a linear ion ring accelerator constructed in accordance with a preferred embodiment of the present invention, with FIG. 3A being a cross sectional view taken along the line A—A of FIG. 3B, and FIG. 3B being a cross sectional view taken along the line B—B of FIG. 3A.
Figure 3B:
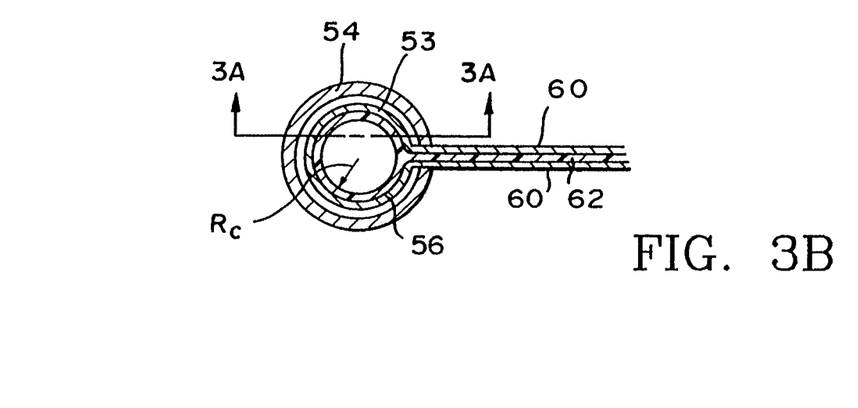

From the ion ring injector 10, the ion ring is injected into a main linear accelerator 50 as illustrated in FIGS. 3A and 3B in which the bulk of the acceleration to high energy occurs. The linear accelerator 50 consists of a plurality of serially arranged acceleration modules 52 disposed along a vacuum chamber 53. As in conventional particle accelerators, a plurality of solenoid coils 54 are also spaced along the length of the vacuum chamber 53. These are energized by a source of direct current (not shown) to generate a uniform static magnetic field along the length of the vacuum chamber 53 for the radial confinement of the ion ring. The solenoid coils 54 can be of the superconductive or cryogenic variety to reduce power requirements if necessary.

Preferably, the vacuum chamber 53 is provided with highly conducting walls to provide image currents to stabilize any precessional motion of the ion ring and to enable the ion ring to propagate around a curved path as required for a recirculator design. Conventional levels of vacuum used in known accelerators are more than adequate for the operation of the ion ring accelerator. The existence of a uniform magnetic field in the accelerator prevents any incidental low energy ionized material from the vacuum wall from reaching the ring. In addition, the ions perform stochastic orbits in the reference frame moving with the ion ring, and this feature will prevent the appearance of particle resonances under the influences of perturbations that are so troublesome in conventional accelerators.

Figure 4:
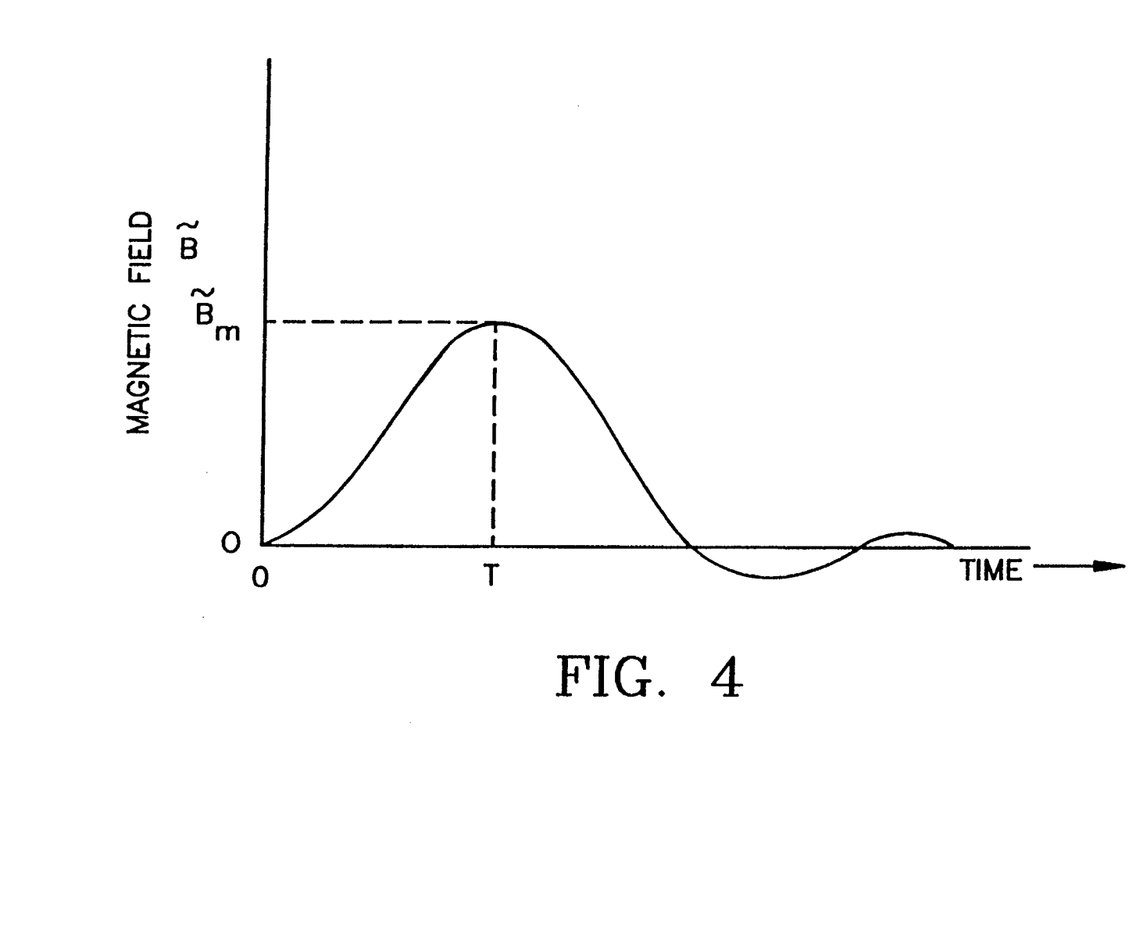
FIG. 4 is a graph illustrating the magnetic field applied the ion ring in each accelerator module as a function of time.

The linear accelerator 50 differs substantially from conventional particle accelerators in the following ways. Since the ion ring is charge neutral, the conventional technique of acceleration by the application of an electric field $\bar{E}_z$ in gaps is inapplicable. An inductive azimuthal electric field $\bar{E}_\theta$ must be applied because the net current is only in the azimuthal direction. In its simplest form as illustrated in FIGS. 3A and 3B, each acceleration module 52 consists of a single turn metal (e.g. copper or aluminum) coil 56 of length $L_c$ and radius $R_c$ along the central longitudinal axis of which, the ion ring travels. Each coil 56 is energized by a corresponding pulse power source 58 through a pair of electrodes 60 separated by a strip of insulation 62. The electric field is:

$$\bar{E}_\theta = -\frac{R}{2c} \frac{\partial}{\partial t} \bar{B}_x$$

where $\bar{B}_z$ is the pulsed magnetic field produced by the current in the coil 56. To obtain maximum acceleration of the ion ring, the time taken by the ring to traverse each coil 56 from one end to the other $$T = \int_0^L dz/\bar{v}_z$$

should be equal to the time taken by $\bar{B}_z$ to rise from zero to the maximum value $\bar{B}_m$ (see FIG. 4). During this period, the energy increment acquired by the ring from the accelerating electric field acting on the net ring current I is:

$$\Delta E = -\frac{2\pi}{c} \int_0^T IR\bar{E}_\theta dt =$$

$$\frac{\pi}{c^2} \int_0^T IR^2 \frac{d}{dt} \bar{B}_z dt = \left(\frac{\pi IR^2}{c^2}\right)\bar{B}_m$$

since the external field B is constant and $\pi IR^2$ is conserved. The increase in energy per ion is $\Delta E/N$ and this energy is entirely in the azimuthal motion of the ions. This process is equivalent to ring compression by an increase in the magnetic field from B to $B+\bar{B}_m$.

As the ring exits each coil 56, the external magnetic field changes from $B+\bar{B}_m$ to B outside the coil. This causes the ring to expand and simultaneously acquire an increment of axial momentum $\Delta P_z$ such that:

$$\Delta E = \bar{v}_z \Delta P_z$$

The final ring radius now equals the initial radius on entry into the coil and the azimuthal energy increment acquired in the coil is converted into axial motion. The procedure repeats itself as the ring enters each of the succeeding accelerator modules 52 and the ring gains additional increments of axial energy. With this arrangement, the energy level of the ion ring can be repeatedly increased without the requirement of an increase in magnitude of the applied fields.

To insure that the magnetic field applied to the ion ring by each of the accelerator modules 52 rises from a minimum to a maximum in the time it takes the ion ring to traverse each module 52, a means must be provided by which the location and the velocity of the ion ring is determined. This can be accomplished, for example, through use of a plurality of small sensor coils 66 spaced along the vacuum chamber 53, each of which generate an electrical output signal as an ion ring passes in the vacuum chamber 53 and feeds it into a computer (not shown).

The computer uses the signals to determine when to trigger each of the pulse power supplies 58 so that a rising, transient magnetic field will be created in each of the accelerator modules 52 as the ion ring passes therethrough. The width of the pulses generated by each of the power supplies 58 will become smaller and smaller as each of the modules 52 successively accelerates the ion ring, but the necessary pulse width for each of the modules 52 can easily be determined by the computer from the various formulas discussed previously.

By way of example, typical specifications for the linear ion ring accelerator 50 are as follows. With an ion ring radius of approximately 8 centimeters, a length of approximately 1.0–1.5 meters for each of the coils 56 and the application of 300 k-amp pulses in the coils for approximately 50 nanoseconds each, approximately 100 of the modules would be required to accelerate an ion ring to 1 MeV.

At the high energy end of the acceleration process when the ring axial velocity has reached a relativistic value, it may be advantageous to replace the pulse power driven coil with a cylindrical resonant cavity of length $L_c$ and radius $R_c$ operated in the TE$_{om1}$ mode at a frequency $$\omega = (\pi c/L_c)(1+p_m L_c^2/\pi R_c^2)^{\frac{1}{2}}$$

where $J_o'(p_m R/R_c)=0$, and $J_o'$ is the derivative of the Bessel function $J_o$. Within this cavity a series of conducting cylinders with accelerating gaps of length $l_n$ are provided as in an Alvarez linac (this arrangement actually differs from the Alvarez linac in providing $\bar{E}_\theta$ and not $\bar{E}_z$ as the accelerating field). The ring is exposed to the accelerating field:

$$\bar{E}_\theta = \bar{E}_o J_1'(\xi r)\sin(\pi z/L_r)\sin \omega t = \bar{E} \sin \omega t$$

only in the gaps $l_n$; $\xi^2 = w^2/c^2 - \pi^2/L_c^2$ and $\xi R = p_m$. The energy increment per ion is given by $$\Delta E/N = q\int_0^{T_n} dt(\bar{v}_0 - \bar{v}_{0e})\bar{E}\sin(\omega t + \phi)$$

$$\approx 2q(\bar{v}_0 - \bar{v}_{0e})\bar{E}/\omega$$

if the ring arrives at the gap $l_n$ at $\phi = 0$ and $wT_n = \pi$ with $T_n = l_n/v_z$ and $$v_s/c = \omega l_n/\pi c = l_n/L_c(1+p_m^2 L_c^2/\pi R_d^2)^{\frac{1}{2}}$$

where $\bar{v}_o$ and $\bar{v}_{oc}$ are the mean azimuthal velocities of the ions and electrons in the ring.

Figure 5:
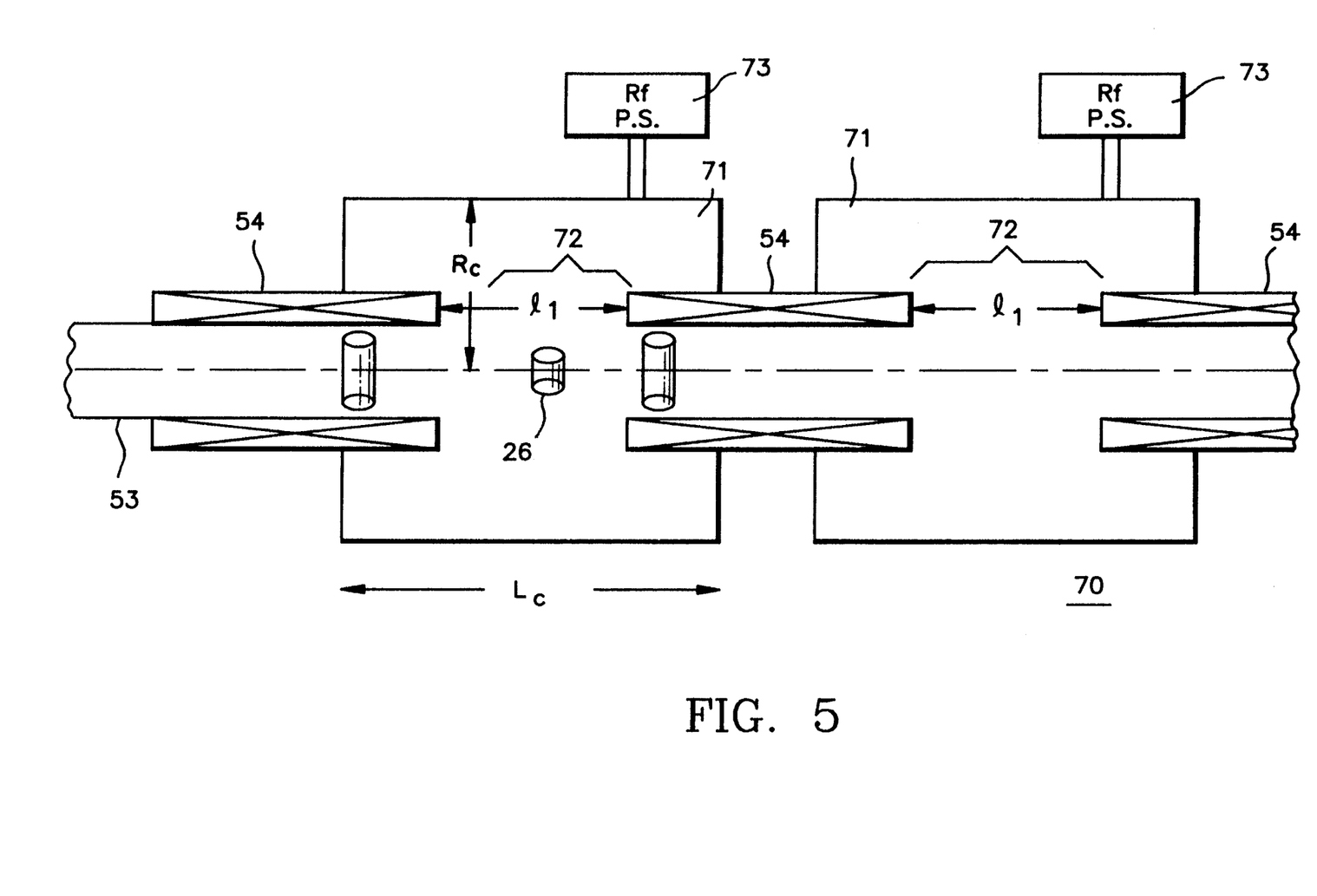
FIG. 5 is a schematic illustration of an accelerator constructed in accordance with another preferred embodiment of the present invention which is employed for accelerating ion rings already travelling at relativistic velocities.

FIG. 5 illustrates a portion of an accelerator 70 constructed in accordance with the previous discussion. Like the linear accelerator 50 of FIGS. 3A and 3B, the accelerator 70 includes a plurality of the accelerator modules 52. However, each of the modules 52 in the accelerator 70 is formed from a cylindrical resonant cavity 71 disposed along the vacuum chamber 53 and interspersed between the static magnetic field coils 54. Each pair of the static magnetic field coils 54 is spaced from the next adjacent pairs of the static coils by an accelerating gap 72 of length $l_1$ contained within each of the resonant cavities 71. Each of the resonant cavities 71 is powered by a corresponding Rf power supply 73. The frequency of each of the power supplies 73 is chosen based upon the velocity of the ion ring so that the ion ring transit time in each accelerating gap 72 equals one half of the Rf period. As with the linear accelerator 50, each of the Rf power supplies 73 will be synchronized with the ion ring so that as the ion ring enters each of the gaps 72, the Rf magnetic field associated with the electric field generated by each of the power supplies 73 will be at a minimum, and the next consecutive maximum will occur as the ion ring exits each of the gaps 72.

Figure 6:
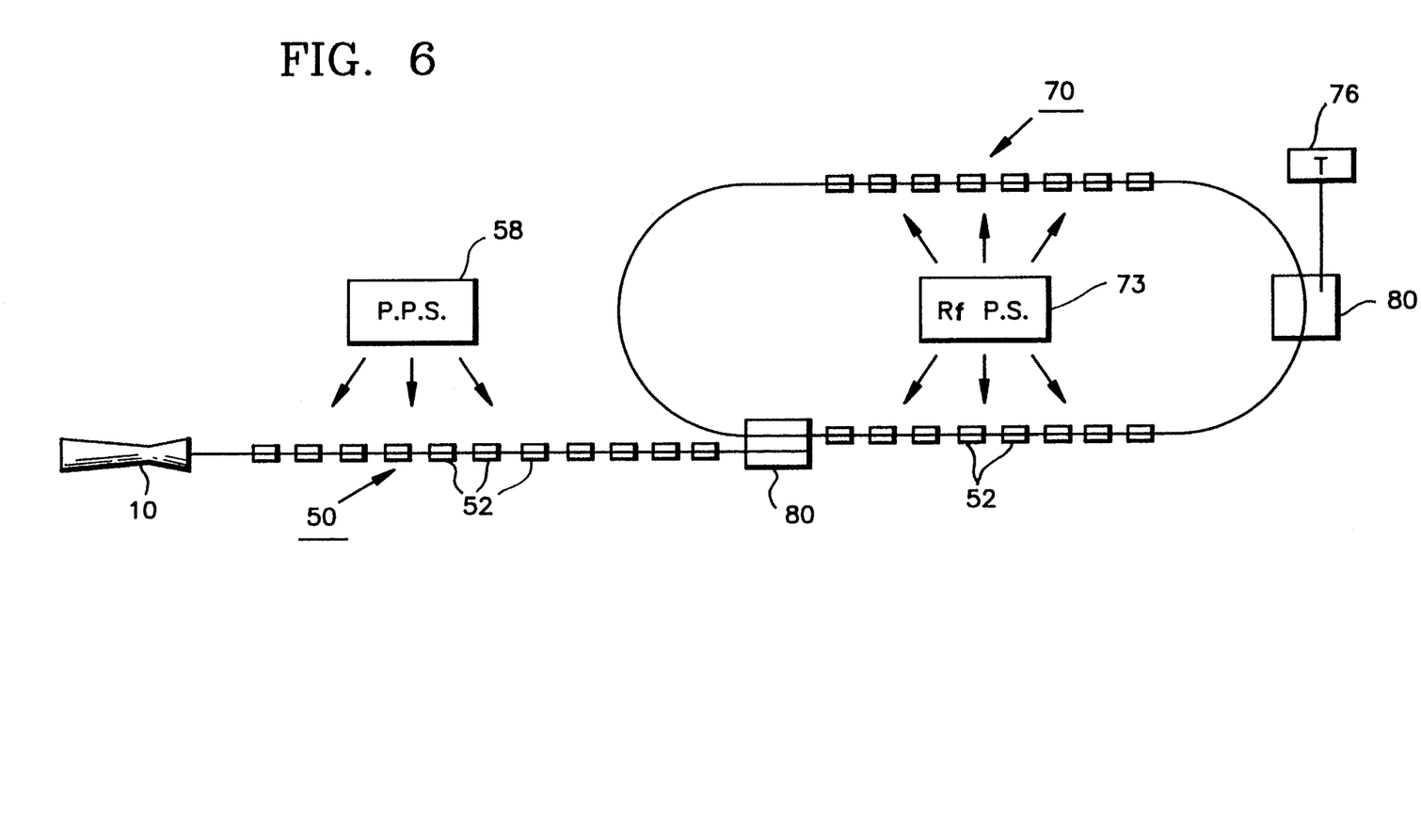
FIG. 6 is a schematic illustration of another accelerator arrangement constructed in accordance with the preferred embodiments of the present invention; and, FIG. 7 is a schematic illustration of an ion ring transfer section which can be employed with the arrangement of FIG. 6.

It should also be noted that at the high energy end of the acceleration process when the ring axial velocity has reached a relativistic value, the velocity increase imparted to the ring by each of the accelerator modules 52 is very small since the ion ring is already travelling near the speed of light. In this situation, the accelerator 70 of FIG. 5 can be formed in a recirculating configuration as illustrated in FIG. 6, and if desired, interfaced to the linear accelerator 50 of FIGS. 3A and 3B so that the ion ring can be transferred from the linear accelerator 50 to the accelerator 70. The ion ring's energy can be repeatedly increased over and over by each of the accelerator modules 52 in the accelerator 70 through application of the same frequency signal from the Rf power supplies 73 since the transit time of the ion ring through each of the modules 52 remains essentially constant. In this situation, the additional energy imparted to the ion ring by each of the accelerator modules 52 increases the momentum of the ion ring.

Figure 7:
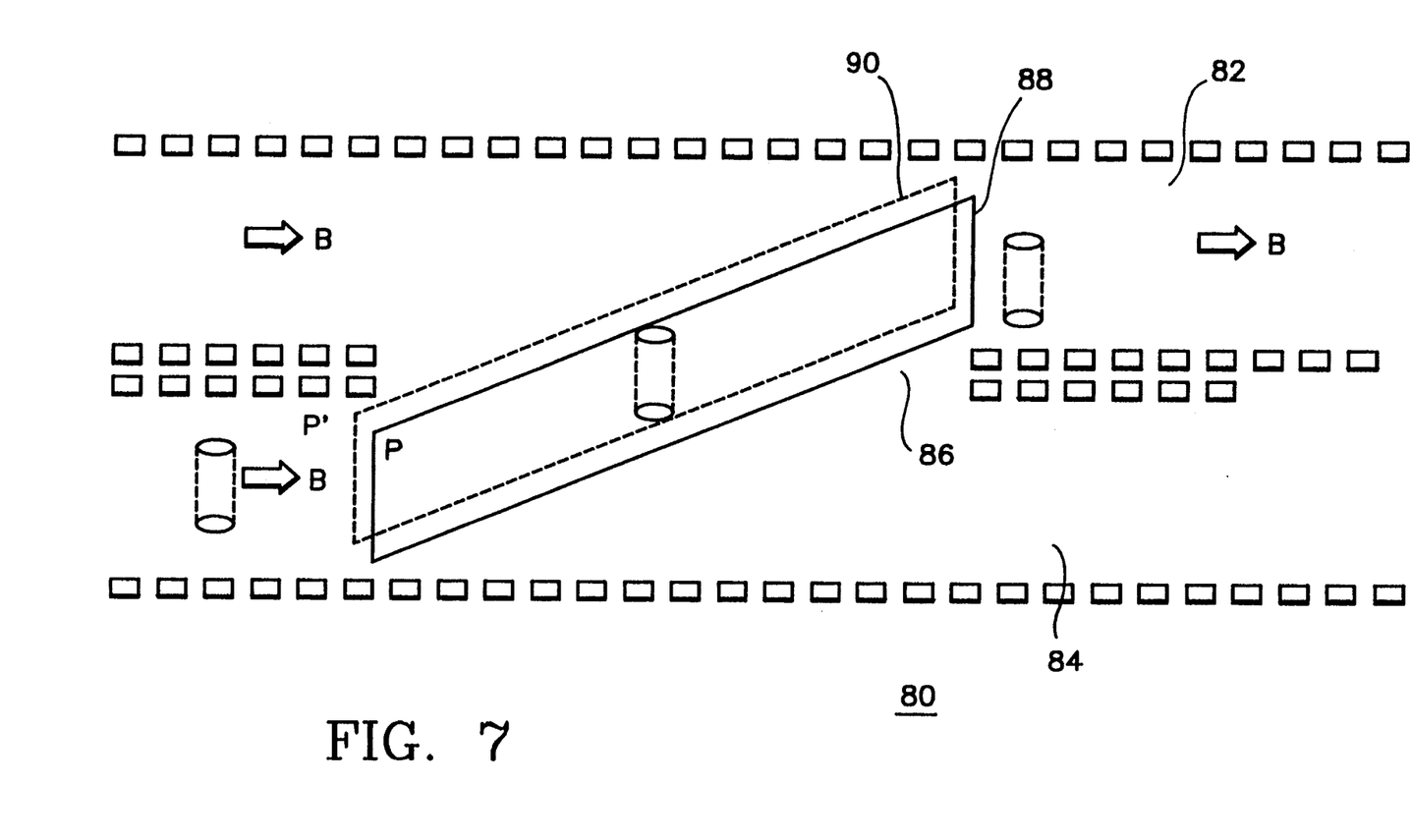

To interface the linear accelerator 50, accelerator 70 and a target 76 with one another, a ring transfer section 80 as schematically illustrated in FIG. 7 is necessary. The transfer section 80 includes first and second tracks 82 and 84 for interfacing with the various accelerator structures. As illustrated, the two tracks 82 and 84 are parallel to one another, and a gap 86 communicates them with one another. A pair of spaced conductive plates 88 and 90 are positioned above and below, respectively, the tracks in a diagonal manner for guiding an ion ring from one track to another. This is accomplished by the application of an external voltage pulse across the plates 88 and 90 which will shift the ion ring in the E×B direction from one track to the other. A voltage of 1 MV across a gap of 15 cm should be sufficient in a field of approximately 50 kG to displace the ion ring transversely 25 cm in $2 \times 10^{-7}$ seconds.

In summary, the present invention provides a particle accelerator in which charged, but not current neutralized ion rings are accelerated through use of an azimuthal inductive accelerating electric field which acts on the net ring current in each of the accelerator modules. Energy in azimuthal motion so acquired from the azimuthal inductive electric field is converted to axial motion and the process can be repeated many times through application of synchronized pulses to the accelerator modules without increasing the magnitude of the applied fields. This arrangement permits acceleration to very high energy levels in the GeV range compactly and efficiently.

Although the invention has been disclosed in terms of a preferred embodiment, it will be understood that variations and modifications could be made thereto without departing from the scope of the invention as defined in the following claims.

What is claimed is:

1. An accelerator structure for accelerating ion rings containing an equal number of positive ions and negative electrons and thereby being charge neutralized, said accelerator structure comprising:
   a plurality of serially arranged accelerator modules for applying a pulsed magnetic field to a charge neutralized ion ring to thereby cause said ring to accelerate, each said accelerator module including means to apply a time varying inductive azimuthal electric field to a charge neutralized ion ring as it passes through each module;
   means to synchronize the time varying inductive azimuthal electric field in each accelerator module with the passage of a charge neutralized ion ring through each module so that the magnitude of a transient magnetic field associated with the electric field is at a minimum as an ion ring enters each module, and is at a maximum as an ion ring exits each module; and,
   means to apply a static magnetic field to a charge neutralized ion ring to confine it radially as it passes through said plurality of serially arranged accelerator modules;
   whereby, the synchronized time varying inductive azimuthal electric field in each accelerator module will cause an incremental increase in energy of a charge neutralized ion ring through compression of the ring in each module, and expansion and acceleration in an axial direction as a ring exits each accelerator module.

2. The accelerator of claim 1 wherein said means to synchronize the time varying inductive azimuthal electric field in each accelerator module with the passage of an ion ring through each module further comprises:
   i) sensor means for generating signals indicating the position of an ion ring in said accelerator relative to each said accelerator module;
   ii) means responsive to said position indicating signals to generate trigger signals; and,
   iii) pulse power supply means responsive to said trigger signals for applying a time varying voltage pulse to each said accelerator module, such that a transient magnetic field resulting from said voltage pulse has a minimum magnitude as the ion ring enters the module, and a maximum magnitude as the ion ring exits the module.

3. The accelerator of claim 1 wherein said means to apply a time varying inductive azimuthal electric field comprises a coil having a central longitudinal axis along which an ion ring travels as it is being exposed to said time varying electric field.

4. The accelerator of claim 3 wherein said plurality of accelerator modules are arranged in a recirculating manner so that an ion ring can be repeatedly accelerated by each of said modules.

5. The accelerator of claim 1 wherein said means to apply a time varying inductive azimuthal electric field comprises a resonant cavity through which an ion ring is directed, said resonant cavity being supplied power from an Rf power supply means.

6. The accelerator of claim 5 wherein said plurality of accelerator modules are arranged in a recirculating manner so that an ion ring can be repeatedly accelerated by each of said modules.

7. The accelerator of claim 1 wherein said plurality of accelerator modules are arranged in a recirculating manner so that an ion ring can be repeatedly accelerated by each of said modules.

8. An accelerator structure for accelerating ion rings containing an equal number of positive ions and negative electrons and thereby being charge neutralized, said accelerator structure comprising:
   a) a plurality of serially arranged accelerator modules for applying a pulsed magnetic field to a charge neutralized ion ring to thereby cause said ring to accelerate; and,
   b) means in each said accelerator module to apply a time varying inductive azimuthal electric field to a charge neutralized ring as it passes through each module, said means comprising a resonant cavity through which an ion ring is directed and an Rf power supply means for supplying power to said resonant cavity.

9. The accelerator of claim 8 wherein said plurality of accelerator modules are arranged in a recirculating manner so that an ion ring can be repeatedly accelerated by each of said modules.

10. A method for accelerating ion rings to high energies comprising the steps of:
   a) forming a charge neutralized ion ring having an ion current flowing therethrough, said charge neutralized ion ring having an equal number of electrons and positive ions;

b) directing said ion ring through a plurality of serially arranged accelerator modules for periodically applying a time varying inductive azimuthal electric field to said ion ring to increase its energy incrementally; and, c) increasing the applied electric field in each said accelerator module as the charge neutralized ion ring travels therethrough so that a transient magnetic field associated with the electric field is at a minimum intensity as the ion ring enters each accelerator module, and is at a maximum intensity as the ion ring exits each accelerator module;

whereby, the ion ring will be compressed by a time varying magnetic field resulting from said time varying electric field as it travels through each said accelerator module, and then will expand and thereby accelerate as it exits each accelerator module.

11. The method of claim 10, further comprising repeatedly accelerating said ion ring by each said accelerator module by arranging said plurality of accelerator modules in a recirculating manner.

12. The method of claim 10 wherein the step of increasing the applied electric field in each said accelerator module further comprises:

i) determining the velocity and position of an ion ring to be accelerated as said ion ring approaches each said accelerator module;

ii) employing the determined position and velocity of said ion ring to determine entry times at which said ion ring will enter each of said accelerator modules; and, iii) employing the determined entry times to apply a voltage pulse to each said accelerator module for generation of said time varying inductive azimuthal electric field such that a transient magnetic field resulting from said voltage pulse has a minimum magnitude as the ion ring enters a corresponding one of said accelerator modules, and a maximum magnitude as the ion ring exits a corresponding one of said accelerator modules.

* * * * *

UNITED STATES PATENT AND TRADEMARK OFFICE
CERTIFICATE OF CORRECTION

PATENT NO. : 5,339,336
DATED : August 16, 1994
INVENTOR(S) : RAVINDRA N. SUDAN It is certified that error appears in the above-identified patent and that said Letters Patent is hereby corrected as shown below:

Column 2, line 68, "Now, $\zeta=B/B$" should read --Now, $\zeta=\delta B/B$--.

Column 5, line 68, "1 MeV" should read --1 GeV--.

Signed and Sealed this

Third Day of January, 1995

*Attest:*

BRUCE LEHMAN

*Attesting Officer*  *Commissioner of Patents and Trademarks*